US010644799B2

(12) United States Patent
Hicks, Jr. et al.

(10) Patent No.: US 10,644,799 B2
(45) Date of Patent: May 5, 2020

(54) WIRELESS INFRASTRUCTURE WITH DISTRIBUTED FIBER NETWORKS

(71) Applicant: Verizon Patent and Licensing Inc., Arlington, VA (US)

(72) Inventors: Roland W. Hicks, Jr., Annandale, NJ (US); Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/220,234

(22) Filed: Dec. 14, 2018

(65) Prior Publication Data

US 2019/0123825 A1   Apr. 25, 2019

Related U.S. Application Data

(62) Division of application No. 15/473,712, filed on Mar. 30, 2017, now Pat. No. 10,218,441.

(51) Int. Cl.
 *G02B 6/44* (2006.01)
 *H01B 11/22* (2006.01)
 *H04B 10/2575* (2013.01)
 *H04B 10/80* (2013.01)
 *H04W 88/08* (2009.01)
 *G02B 6/48* (2006.01)

(52) U.S. Cl.
 CPC ..... *H04B 10/25753* (2013.01); *G02B 6/4416* (2013.01); *G02B 6/4429* (2013.01); *G02B 6/483* (2013.01); *H01B 11/22* (2013.01); *H04B 10/808* (2013.01); *H04W 88/085* (2013.01); *G02B 6/4433* (2013.01); *G02B 6/4434* (2013.01)

(58) Field of Classification Search
 None
 See application file for complete search history.

(56) References Cited

U.S. PATENT DOCUMENTS

| 4,695,127 | A | * | 9/1987 | Ohlhaber | G02B 6/443 174/70 R |
|---|---|---|---|---|---|
| 4,864,318 | A | * | 9/1989 | Iwasaki | H01Q 1/38 343/720 |
| 5,784,034 | A | * | 7/1998 | Konishi | H01Q 21/29 343/872 |
| 6,871,081 | B1 | * | 3/2005 | Llewellyn | H04W 88/085 343/770 |
| 7,786,894 | B2 | * | 8/2010 | Polk | H04L 12/66 324/764.01 |
| 7,852,837 | B1 | * | 12/2010 | Au | H04B 1/74 370/389 |
| 10,122,080 | B2 | * | 11/2018 | Lai | H01Q 1/22 |
| 2003/0202756 | A1 | * | 10/2003 | Hurley | G02B 6/4422 385/101 |

(Continued)

*Primary Examiner* — Michelle R Connelly

(57) ABSTRACT

Systems described herein provide antenna elements, each of which contains an antenna array and electronics, built into a fiber optic aerial cable to form a hybrid cable. The hybrid cable has a fiber buffer tube including one or more fiber cores, an outer sheath surrounding the fiber buffer tube, and a distributed array of antenna elements around portions of the outer sheath along a length of the hybrid fiber optic cable. Each of the antenna elements includes an antenna and control electronics for the antenna.

20 Claims, 12 Drawing Sheets

(56) References Cited

U.S. PATENT DOCUMENTS

| | | | |
|---|---|---|---|
| 2012/0262350 A1* | 10/2012 | Tesh | H01Q 1/273 |
| | | | 343/720 |
| 2016/0149312 A1* | 5/2016 | Henry | H01Q 21/00 |
| | | | 343/893 |
| 2017/0126321 A1* | 5/2017 | Boxer | H04B 10/25753 |
| 2018/0191080 A1 | 7/2018 | Henry et al. | |
| 2018/0198529 A1* | 7/2018 | Boxer | H04B 10/25756 |

\* cited by examiner

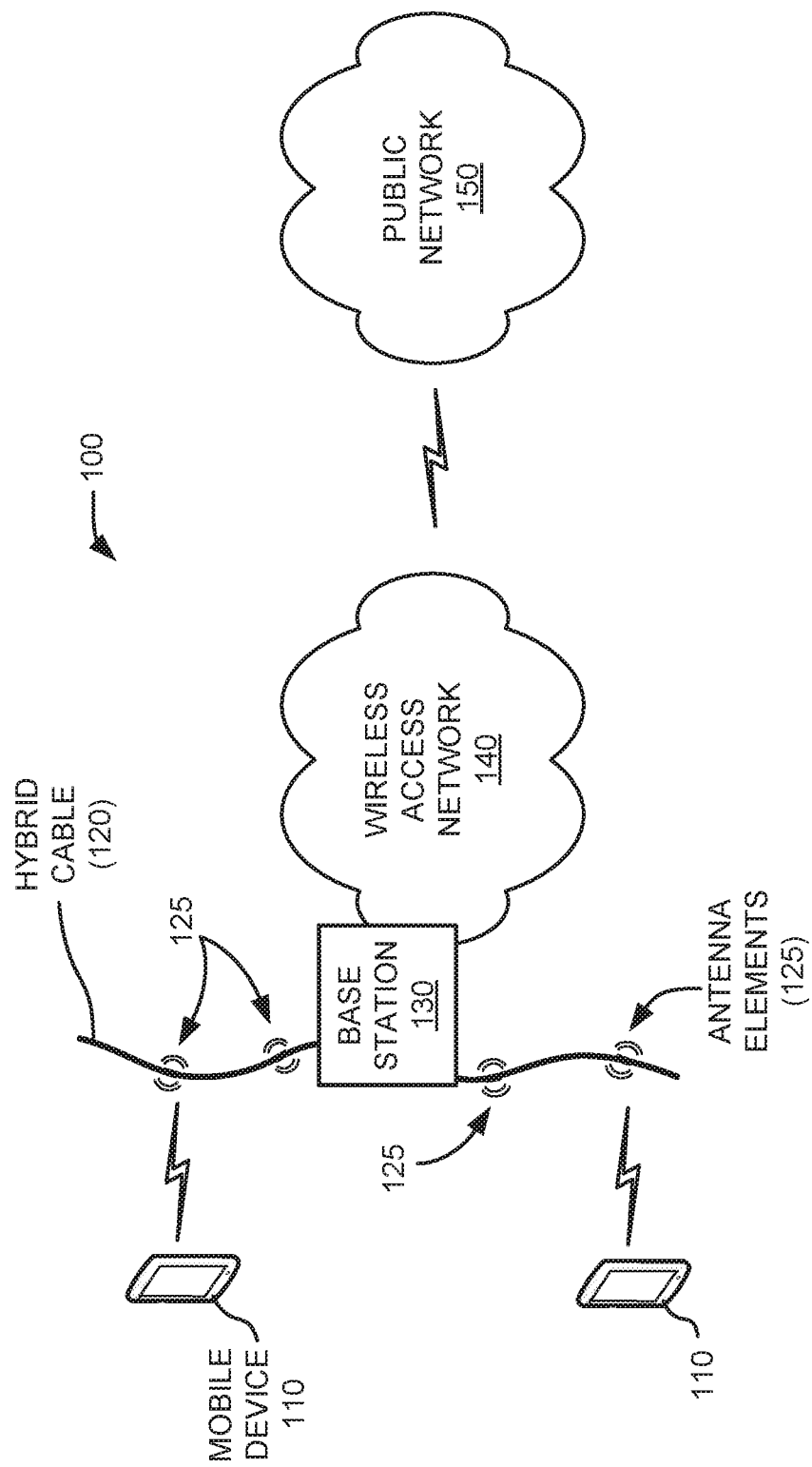

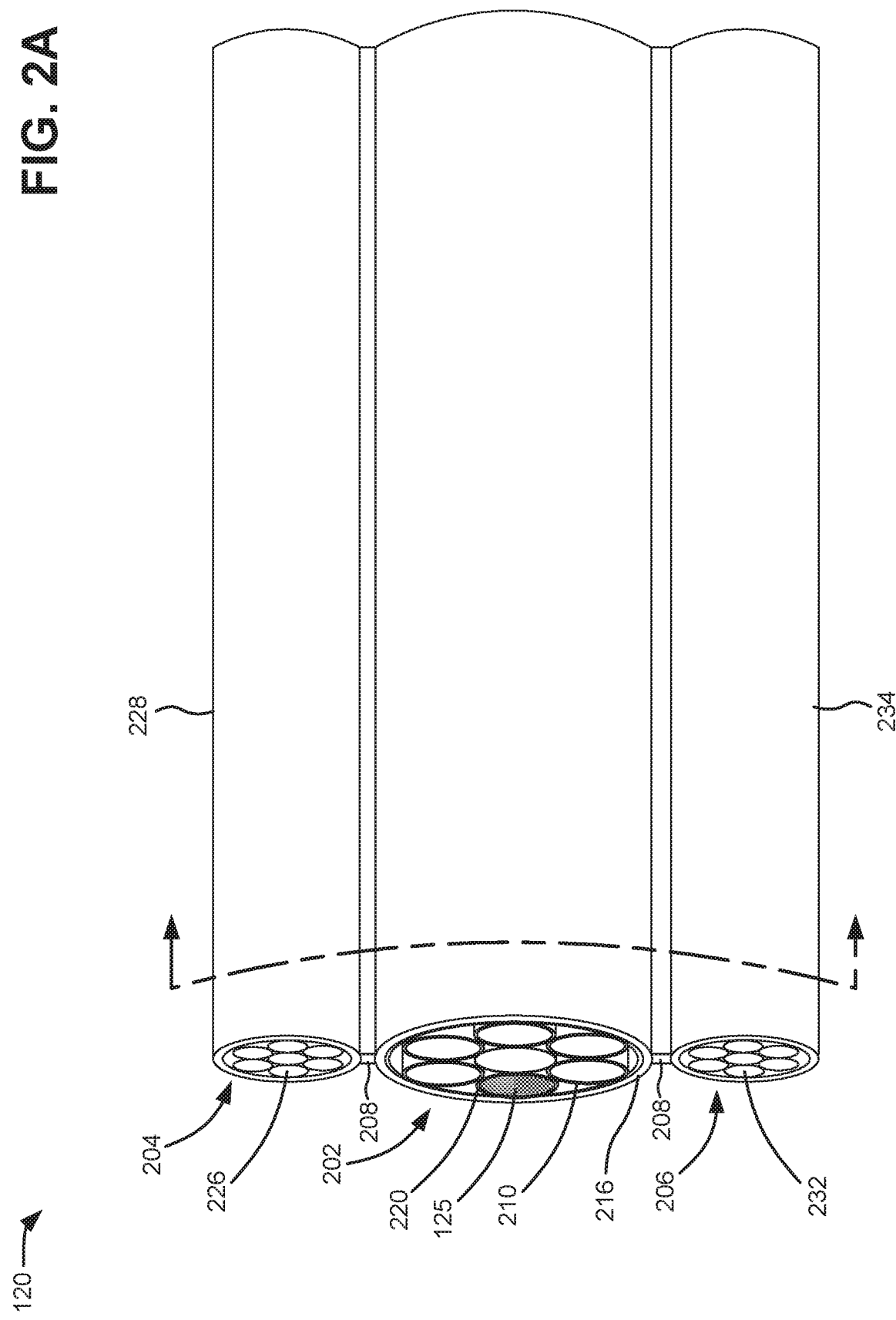

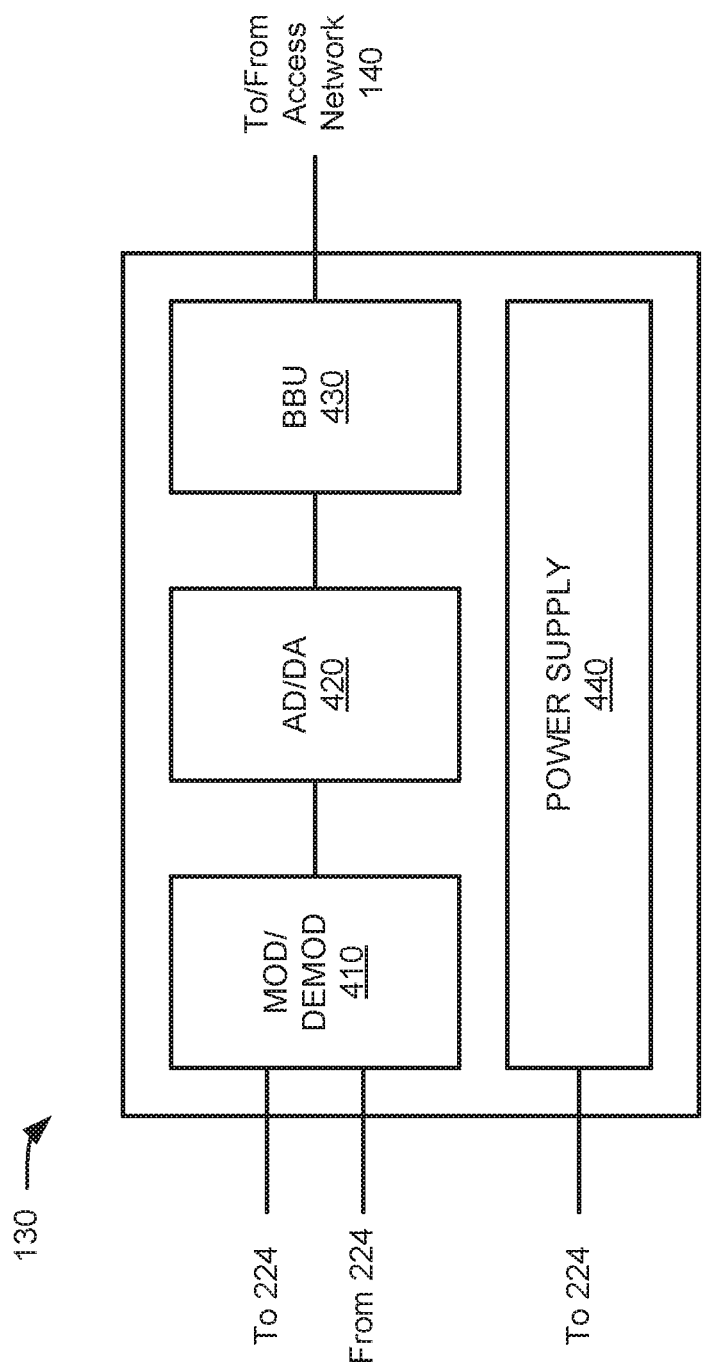

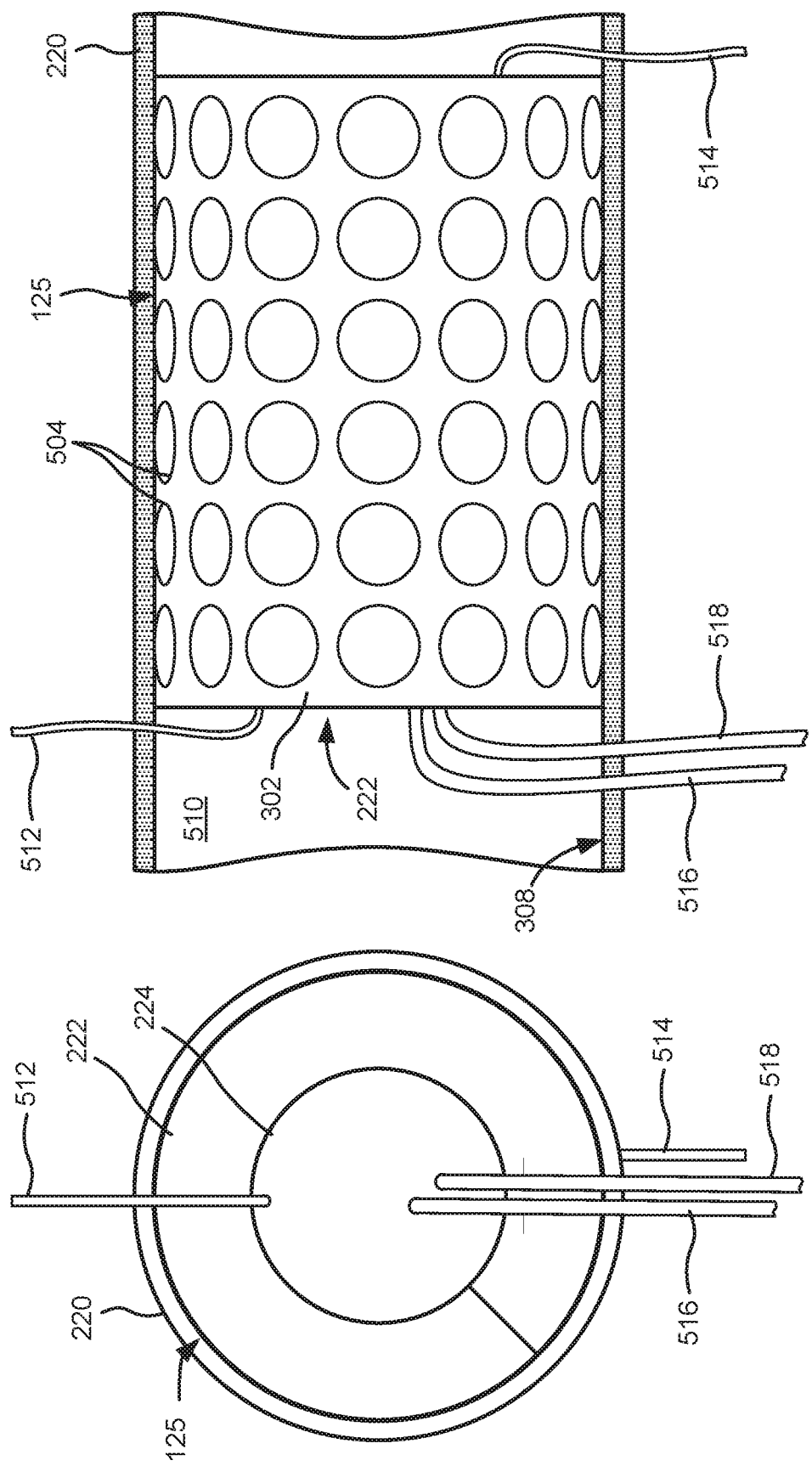

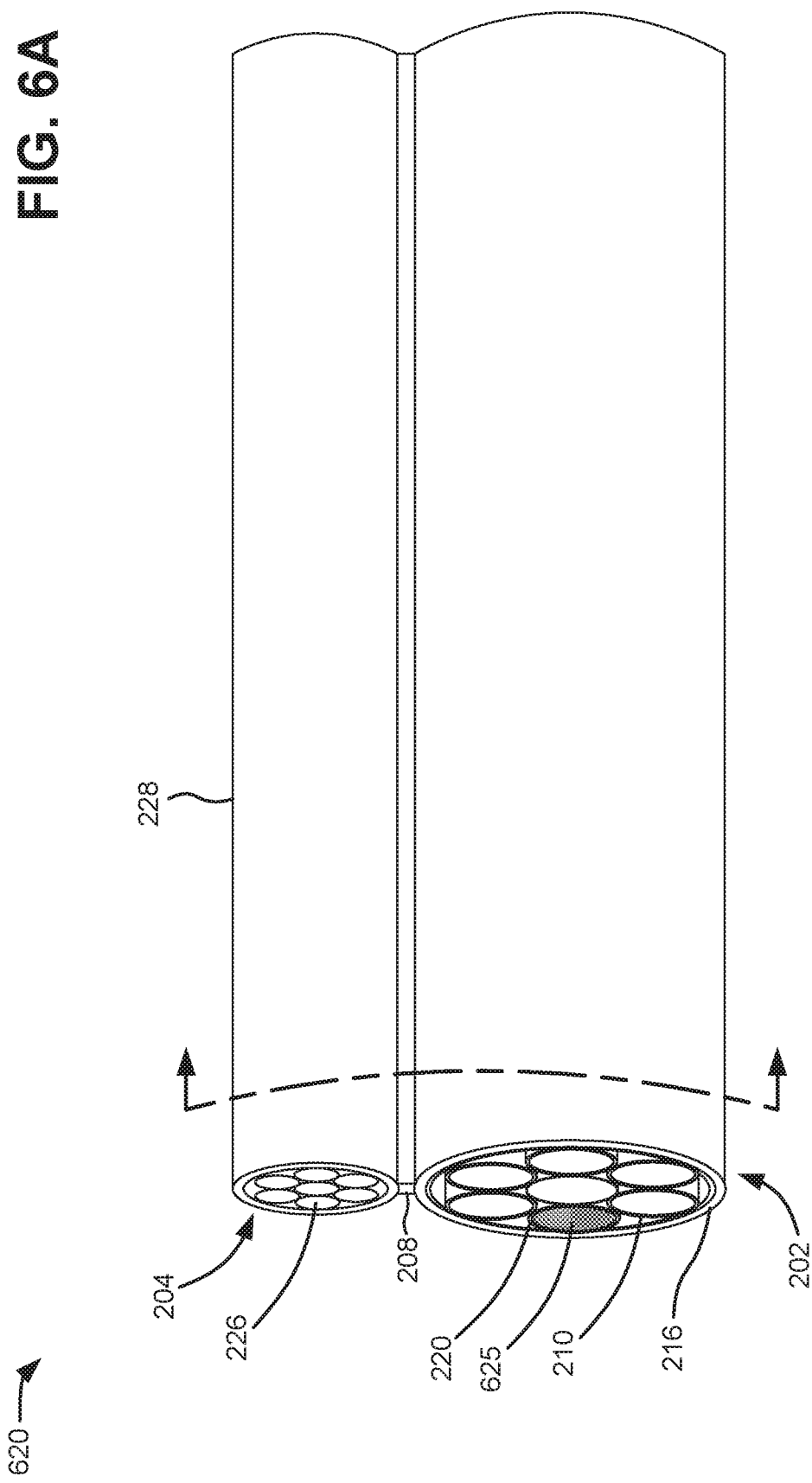

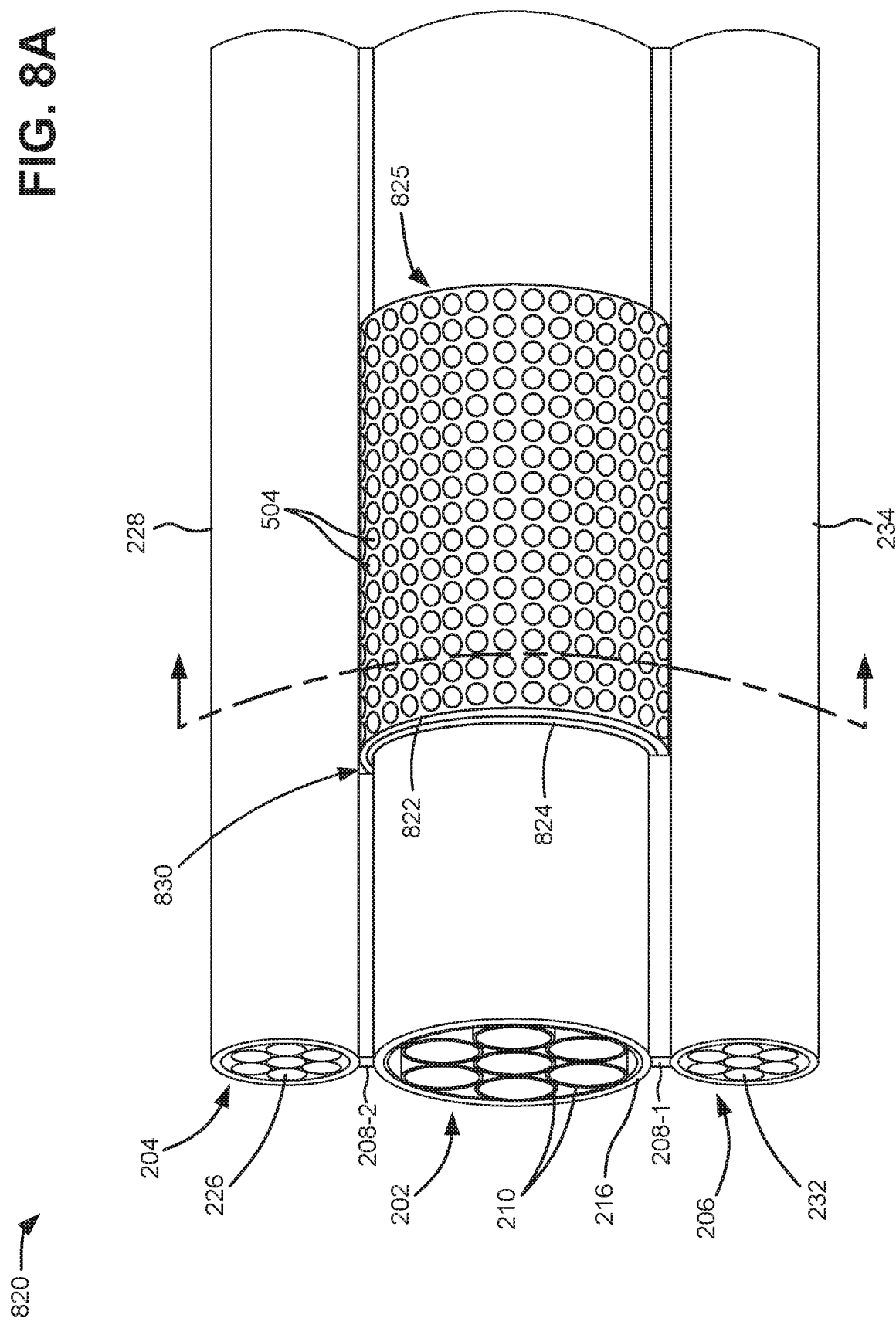

WIRELESS INFRASTRUCTURE WITH DISTRIBUTED FIBER NETWORKS

CROSS REFERENCE TO RELATED APPLICATION

This application is a divisional of U.S. patent application Ser. No. 15/473,712 filed on Mar. 30, 2017, the disclosure of which is hereby incorporated by reference.

BACKGROUND

Developing and future cellular network standards rely on high-frequency or extremely-high-frequency radio frequency (RF) signals. These high-frequency RF signals can provide higher bandwidth and lower latency to customers and for machine-type communications (MTC), but with shorter signal range. For example, as wireless services move from 4G/LTE standards to 5G standards for Third Generation Partnership Project (3GPP) networks, many more antennas must be deployed to support higher-frequency signals. The typical distance between adjacent antenna arrays in a 4G wireless network is about 1 or 2 miles. In a 5G network, the required distance between adjacent antennas could be reduced to about 1,000 feet or even less.

BRIEF DESCRIPTION OF THE DRAWINGS

FIG. 1 is a diagram that depicts an exemplary network environment in which systems and methods described herein may be implemented;

FIGS. 2A and 2B are perspective and cross-sectional diagrams of a portion of a hybrid fiber optic cable of FIG. 1, according to an implementation described herein;

FIG. 4 is a block diagram of exemplary components of a base station of FIG. 1;

FIG. 5A is a simplified front view of an antenna element of FIGS. 2A and 2B inside an antenna element buffer tube;

FIG. 5B is a simplified partial cross-sectional view of the antenna element buffer tube of FIGS. 2A and 2B;

FIGS. 6A and 6B are perspective and cross-sectional diagrams of a portion of a hybrid fiber optic cable of FIG. 1 according to another implementation described herein;

FIGS. 8A and 8B are perspective and cross-sectional diagrams of a portion of a hybrid fiber optic cable of FIG. 1 according to yet another implementation described herein.

DETAILED DESCRIPTION OF THE PREFERRED EMBODIMENTS

Figure 2B:
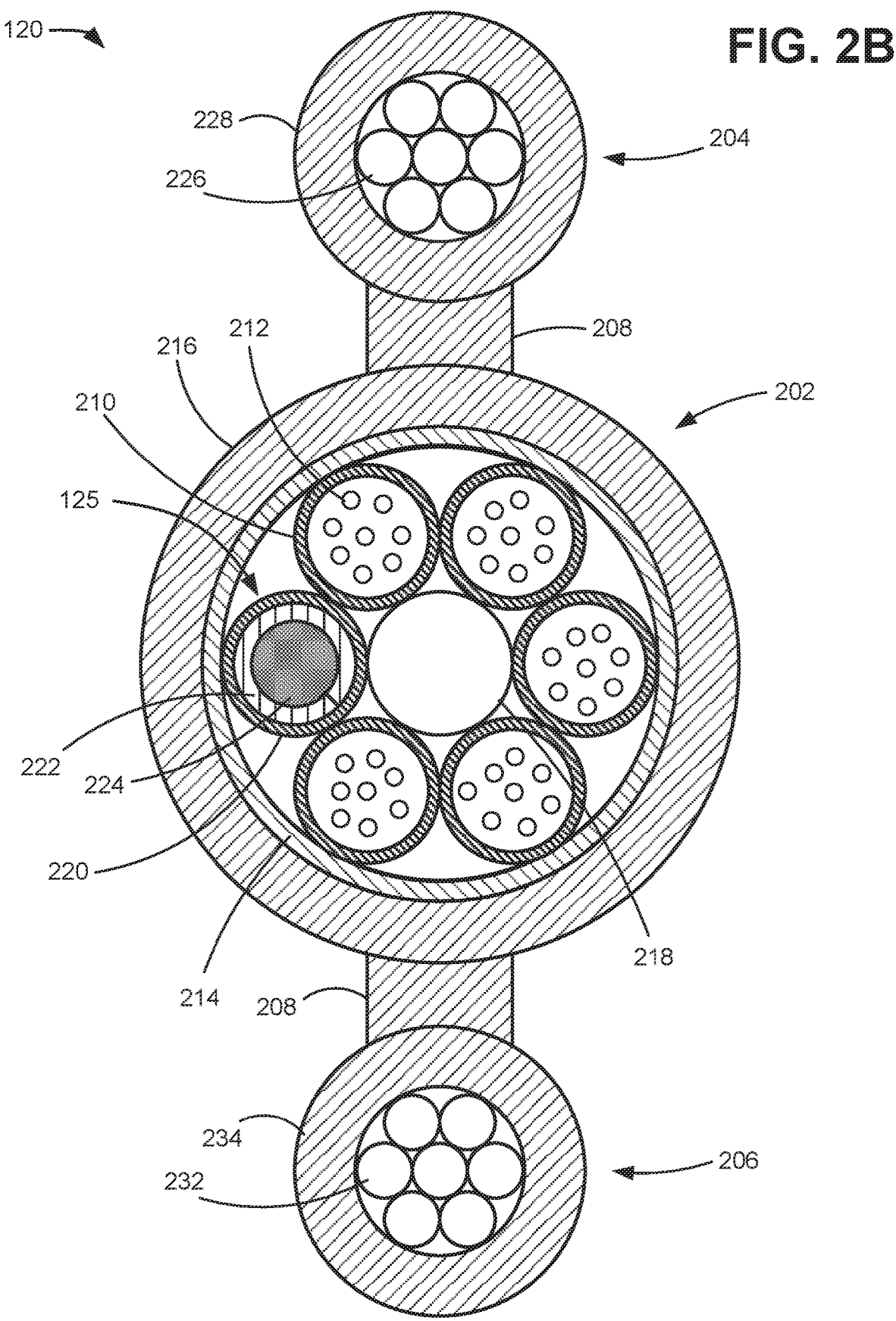

The following detailed description refers to the accompanying drawings. The same reference numbers in different drawings may identify the same or similar elements.

Future cellular networks, such as 3GPP 5G networks, require more densely populated antenna elements than previous cellular or wireless networks. Such networks may use high-frequency signals or extremely-high-frequency signals in or approaching the millimeter-wave (mmWave) frequency band (such as 28 Gigahertz (GHz) RF, for example). As used herein mmWave frequencies may include RF frequencies from about 24 GHz to 100 GHz. At these frequencies, the RF waves are more confined in space, with wavelengths as small as one millimeter, and are more directional than lower frequency RF waves. To increase throughput using these high-frequencies, more antenna elements may be used in each antenna.

Since some fiber networks have a deep penetration to neighborhoods and communities, they provide a unique opportunity to incorporate high-frequency antenna elements utilizing existing fiber network infrastructure. Multi-fiber cables provide protection from the environments and a method to deploy optical fibers in various environments. Various cable constructions exist, depending on the type of deployment and/or vintage (direct buried, aerial, conduit, etc.). Particularly, a fiber infrastructure with aerial cables provides optimal line-of-sight locations for high-frequency antenna element distribution.

According to an implementation, a high-frequency antenna element, which contains an antenna array and control electronics, can be integrated within an aerial cable as a buffer tube section. According to another implementation, a high-frequency antenna element can also be designed as a band wrapped around a portion of an aerial cable. In one embodiment, a conventional aerial fiber cable can be redesigned as a hybrid cable with two conducting lines (power and ground) and glass fiber. The hybrid cable can provide electrical power via the metal lines and provide signal connections between the high-frequency antenna elements and a base station via the glass fiber. The high-frequency antenna elements may then be installed at desired locations and density in a fiber network. For example, pre-configured hybrid cable sections, manufactured with different spacing of high-frequency antenna elements, may be selected for different installations.

FIG. 1 is an exemplary network environment 100 in which systems and/or methods described herein may be implemented. As illustrated, network environment 100 may include a mobile device 110, a hybrid cable 120 with antenna elements 125, a base station device 130, a wireless access network 140, and a public network 150. Components of network environment 100 may be connected via wired and/or wireless links.

Mobile device 110 may include any type of device that is able to transmit and receive data, such as text data, video data, image data, audio data, multi-media data, etc., over a cellular network using high-frequency (e.g., mmWave) signals. For example, mobile device 110 may include a mobile terminal (e.g., a smart phone, smart watch, or the like), some type of computer (e.g., as a personal computer (PC), a tablet computer, a laptop computer, a wearable computer, etc.), a personal digital assistant (PDA), a web-based appliance, etc. Mobile devices 110 may also include a telephone, such as an Internet-protocol (IP) based phone, a wireless telephone, a vehicular infotainment system that includes telephone capabilities, etc., used to make and receive telephone calls. Mobile device 110 may be subscribed to mobile telephony services and/or mobile data services provided in association with wireless access network 140. Mobile data services may include any activity that consumes data over a cellular broadband network and may be implemented, for example, in conjunction with or as a consequence of, mobile device 110 sending or receiving data from accessing websites, applications, etc.

Hybrid cable 120 may include a fiber optic cable that can be used for providing telecommunication services to business and residential locations. Hybrid cable 120 may include, for example, an optical fiber cable that contains one or more optical fibers. According to implementations described herein, hybrid cable 120 may also include multiple antenna elements 125 for receiving and transmitting wireless signals. As described further herein, each of antenna elements 125 may include a tube-shaped antenna and associated electronics within a section of hybrid cable 120. As describe further herein, antenna elements 125 may be configured to receive and transmit high-frequency RF signals (e.g., mmWave frequency band signals). In one implementation, antenna elements 125 may form a distributed array along a length of hybrid cable 120. Hybrid cable 120 may connect to base station 130, which may control multiple antenna elements 125.

Base station device 130 (also referred to simply as "base station 130") may include one or more devices that receive voice and/or data signals from wireless access network 140 (e.g., downlink signals) and transmit the voice and/or data signals to mobile device 110 using antenna elements 125 via an air interface. Base station 130 may also include one or more devices that receive voice and/or data signals from mobile device 110 (e.g., uplink signals) using antenna elements 125 via an air interface and transmit the voice and/or data signals to wireless access network 140.

Wireless access network 140 may include a wireless communications network that connects subscribers (e.g., mobile devices 110) to other networks (e.g., public network 150). In one example, access network 140 may include a broadband cellular network using use high-frequency signals in the mmWave frequency band. For example, wireless access network 140 may support future wireless standards, such as 3GPP 5G wireless standards. In other implementations, wireless access network 140 may include a long-term evolution (LTE) network, a WiFi network (e.g., using IEEE 802.11 standards) or other access networks (e.g., an E-UTRAN, an enhanced high-rate packet data (eHRPD) network, or another 3G, 4G, or future access network). In another example, access network 140 may include a radio access network using mmWave or higher frequencies.

Public network 150 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, a fiber-optics network (e.g., passive optical networks (PONS)), an ad hoc network, or another type of network. In an exemplary implementation, public network 150 may include a combination of networks and other components (e.g., switches, routers, etc.) for transmitting data to and from wireless access network 140. For example, wireless access network 140 may connect to public network 150 to allow mobile device 110 to communicate with service providers and/or other devices. In exemplary implementations, public network 150 may provide access to a service provider that facilitates voice, text, and/or data services over a proprietary interface and/or protocol.

While FIG. 1 shows exemplary components of network environment 100, in other implementations, network environment 100 may include fewer components, different components, differently-arranged components, or additional components than depicted in FIG. 1. Additionally or alternatively, one or more components of network environment 100 may perform functions described as being performed by one or more other components of network environment 100.

FIGS. 2A and 2B are perspective and cross-sectional diagrams, respectively, of a portion of hybrid cable 120 according to an implementation. Hybrid cable 120 may include a multi-fiber cable section 202, a first support section 204, and a second support section 206 each coupled by a connecting section 208 (sometimes referred to as a "gallus"). Multi-fiber cable section 202 may include a dielectric strength member (e.g., corrugated steel tape) 214 and/or a water blocking layer (not shown separately) surrounded by an outer jacket or sheath 216. Sheath 216 may include, for example, a thermoplastic material such as polyethylene.

Multi-fiber cable section 202 may hold one or more fiber buffer tubes 210 with optical fibers 212 arranged therein. In one implementation, fiber buffer tubes 210 may be hollow tubes formed from a thermoplastic material, such as polybutylene terephthalate (PBT). Each of fiber buffer tubes 210 may be sized to accommodate multiple loose optical fibers 212 (e.g., six to twelve fibers) therein. In some implementations, a gelatinous filling compound may be included inside fiber buffer tubes 210 to prevent water intrusion through fiber buffer tubes 210. Optical fibers 212 may include coated glass (e.g., doped silica) fibers for telecommunications. A central strength member 218, such as a coated or uncoated steel wire, may also be included inside multi-fiber cable section 202 with fiber buffer tubes 210.

According to an implementation, an antenna tube 220 may house antenna elements 125 spaced along a length of hybrid cable 120. A multi-antenna configuration of antenna elements 125 may be used to facilitate a ground coverage pattern for wireless access, perform beam steering, and/or provide multiple-input multiple-output (MIMO) operation. In one implementation, as shown in FIGS. 2A and 2B, antenna tube 220 may be of the same material and dimensions as fiber buffer tubes 210. In another implementation antenna tube 220 may be have a slightly larger or smaller diameter than fiber buffer tubes 210 and may be formed from a different material than fiber buffer tubes 210. In one implementation, antenna tube 220 may have an inside diameter of about 1 to 5 mm, preferably, 2 mm to 2.5 mm.

Each antenna element 125 may include a tube-shaped antenna array 222 and control electronics 224. As described further below (e.g., in connection with FIG. 5B), tube-shaped antenna array 222 may include multiple antenna apertures to receive and transmit high frequency (e.g., mmWave) signals for mobile broadband communications.

Tube-shaped antenna array 222 may be coupled to control electronics 224. Control electronics 224 may include, for example, transceiver circuitry for transmitting and/or receiving symbol sequences via tube-shaped antenna array 222. In one implementation, control electronics 224 may include one or more RF transceivers that enable base station 130 to communicate with mobile devices 110 via wireless communications. An RF transceiver may include an RF transmitter that receives signals to be transmitted wirelessly and performs signal processing on the signals before providing the signals to tube-shaped antenna array 222, and an RF receiver that receives signals from tube-shaped antenna array 222 and performs signal processing on the received signals before providing the received signals to base station 130. For example, the RF transceiver may perform analog-to-digital and digital-to-analog conversion, modulation and demodulation, up-conversion and down-conversion, and/or amplification of signals.

First support section 204 may include a metal strength member 226, such as a twisted steel cable, surrounded by an outer jacket or sheath 228. Similarly, second support section 206 may include a metal strength member 232, such as a twisted steel cable, surrounded by an outer jacket or sheath 234. In addition to providing support for multi-fiber cable section 202, first support section 204 may supply electrical power for use by antenna elements 125 and second support section 206 may provide a path to ground. In one implementation, metal strength members 226/232 may include multiple types of insulated materials, including a copper wire. In another implementation, only one of first support section 204 or second support section 206 may be sized to provide strength for supporting multi-fiber cable section 202, while the other of first support section 204 or second support section 206 may include smaller wires to, for example, conduct electricity. In still another implementation, insulated power cables and grounding cables may be combined in a single support section. In different implementation, central strength member 218 may be used as a power supply path or grounding path instead of one or both of metal strength members 226/232.

Figure 3:
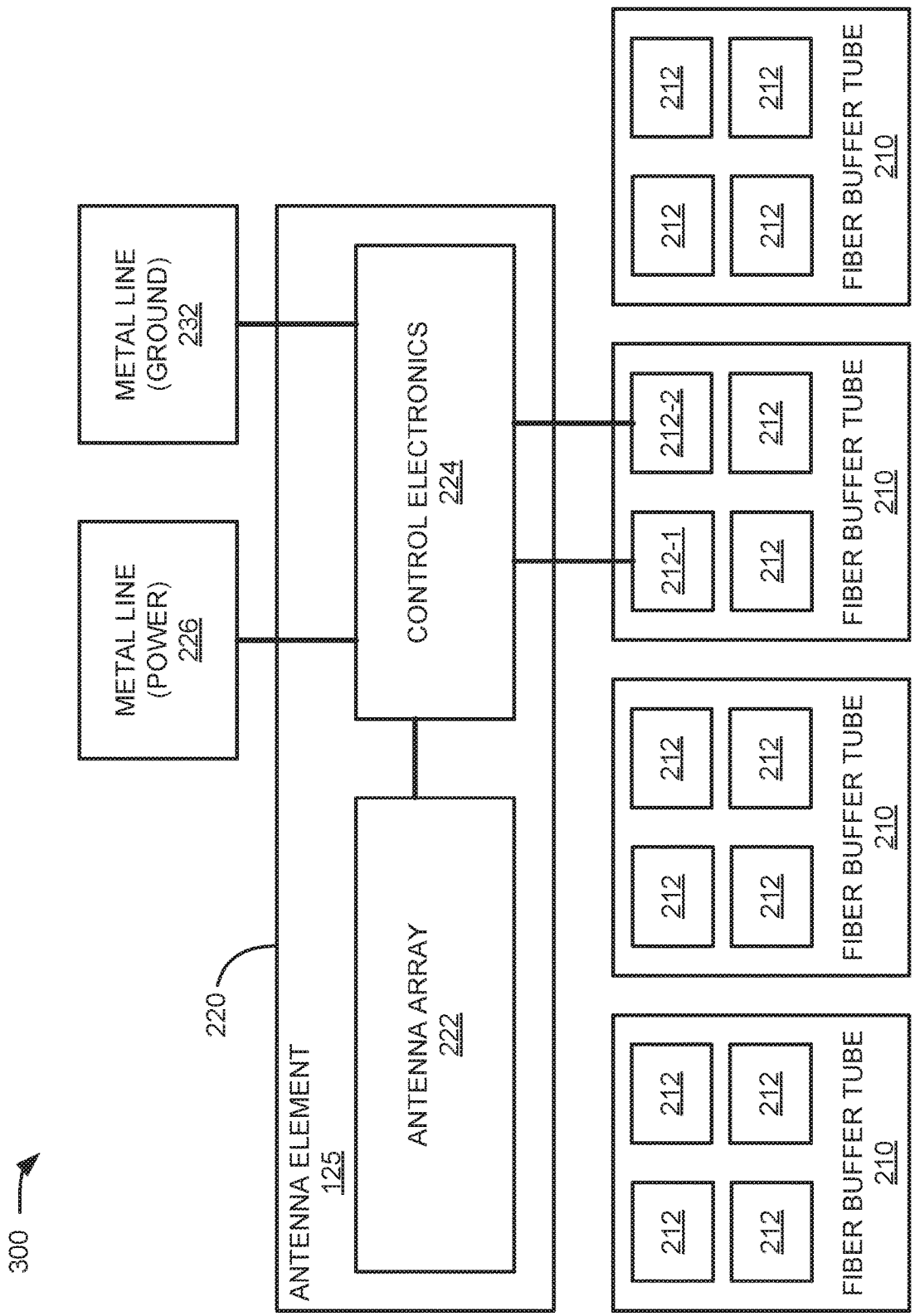
FIG. 3 is a block diagram showing exemplary components of the hybrid fiber optic cable of FIG. 1, according to an implementation described herein.

FIG. 3 is a block diagram showing exemplary components of portion 300 of hybrid cable 120, according to an implementation described herein. As shown in FIG. 3, cable portion 300 may include antenna element 125 provided within antenna tube 220, fiber buffer tubes 210, metal strength member 226, and metal strength member 232.

Metal strength member 226 may be connected to a power source associated with base station 130, for example, to conduct electricity to antenna elements 125 along hybrid cable 120. Metal strength member 232 may be connected to a grounding element associated with base station 130 or any other location. In one implementation, control electronics 224 of antenna elements 125 obtains power from metal strength member 226 and is grounded via metal strength member 232.

One or more pairs of fibers 212 in fiber tubes 210 of hybrid cable 120, such as fibers 212-1 and 212-2, may be connected directly or indirectly to base station 130. Control electronics 224 may communicate with base station 130 by the pair of fibers. For example, control electronics 224 may receive signals from tube-shaped antenna array 222, may perform signal processing, and may forward the processed signals to base station 130 via fibers 212-1 and 212-2. Also, base station 130 may provide both communications and control signals to control electronics 224 via fibers 212-1 and 212-2. In another implementation described further herein, power lines and/or another pair of communication fibers may be included within antenna tube 220.

FIG. 4 is a block diagram of exemplary components of a base station 130. As shown in FIG. 4, base station 130 may include a modulator/demodulator (MOD/DEMOD) 410, an analog to digital/digital to analog converter (AD/DA) 420, a baseband unit (BBU) 430, and a power supply 440.

MOD/DEMOD 410 (also called a modem) modulates signals to encode digital information for transmission and demodulates signals to decode received information. For example, MOD/DEMOD 410 may extract a data signal carried in a carrier signal within a group of frequency ranges (e.g., mmWave frequencies). The data signal extracted by MOD/DEMOD 410 may represent encoded signals. For example, For example, AD/DA 420 may convert the data signals into one or more symbols. For example, a phase-shift keying (PSK), an orthogonal frequency-division multiplexing (OFDM), or other digital modulation scheme may be used to convey data by modifying an attribute of the carrier signal, and MOD/DEMOD 410 may extract the encoded data from the modified carrier signal.

AD/DA 420 may convert the data signals extracted by MOD/DEMOD 410 to a digital form to extract data carried by the signals. For example, AD/DA 420 may convert the data signals into one or more symbols.

BBU 430 may include one or more processors, microprocessors, etc., that are responsible for digital baseband signal processing. BBU 430 may further handle, for example, termination of an S1 line used for connecting to a core network (such as a core network for wireless access network 140) termination of an X2 line used for connecting with another base station 130, call processing, and monitoring of control processing.

Power supply 440 may provide power to control electronics 224 of antenna elements 125. In one implementation, power supply 440 may include an uninterruptible power supply (UPS) to provide back-up power to various types of systems when there is a failure of a utility power source to supply power.

Base station 130 may include fewer components, additional components, different components, and/or differently arranged components than those illustrated in FIG. 4. Additionally, or alternatively, one or more operations described as being performed by a particular component of base station 130 may be performed by one or more other components, in addition to or instead of the particular component of base station 130.

FIG. 5A is a simplified front view of antenna elements 125, and FIG. 5B is a simplified partial cross-sectional view of a portion of antenna tube 220 with antenna element 125. Referring to FIGS. 5A and 5B, tube-shaped antenna array 222 is wrapped around control electronics 224 within a portion of antenna tube 220. Tube-shaped antenna array 222 may comprise a thin, planar mmWave antenna 502 that is bent into a tube-shape. Antenna 502 may include multiple antenna apertures 504. The small wavelengths of mmWaves permit a comparatively large number of antenna apertures 504 on mmWave antenna 502 in a small form factor within the diameter of antenna tube 220. In one implementation, where antenna tube 220 has similar dimensions to a standard fiber buffer tube 210, the corresponding circumference of antenna 502 may be about 6 to 8 mm with an axial length of about 6 to 8 mm or more. In other implementations, antenna 502 may be between about 4 to 30 mm with an axial length of 4 to 60 mm or more. Tube-shaped antenna array 222 may be bonded or mechanically secured to a portion of an interior surface 508 of antenna tube 220, and control electronics 224 may be secured to tube-shaped antenna array 222.

As illustrated, for example, in FIG. 1, multiple antenna elements 125 may be included in hybrid cable 120. For example, antenna elements 125 may be spaced apart at intervals of a about a few feet or yards (e.g., 5-foot, 25-foot intervals, 100-foot intervals, 300-foot intervals, etc.) within a single antenna tube 220. In another example, groupings of antenna elements 125 (e.g., multiple elements 125 spaced within a few feet) may be placed at larger intervals (e.g., hundreds of feet) within antenna tube 220. Open space or a filler material 510 (e.g., a thixotropic gel compound, a solid flexible material, etc.) may separate antenna elements 125 within antenna tube 220.

Power for the antenna elements 125 may be provided from a metal conductor, such as metal strength member 226 via a power line 512 that connects control electronics 224 to metal strength member 226. In one implementation, power line 512 may pass through antenna tube 220, dielectric strength member 214, sheath 216, connecting section 208, and sheath 228 to connect control electronics 224 to metal strength member 226. Similarly, grounding wire 514 may connect control electronics 224 to metal strength member 232. Grounding wire 514 may pass through antenna tube 220, dielectric strength member 214, sheath 216, connecting section 208, and sheath 234 to connect control electronics 224 to metal strength member 232.

Communication signals between antenna elements 125 and base station 130 may be provided via two or more optical fibers, such as a pair of optical fibers 516/518 that connect control electronics 224 to optical fibers 212. Fibers 212 may extend through hybrid cable 120 between antenna elements 125 and base station 130. In one implementation, optical fibers 516/518 may pass through antenna tube 220 and fiber buffer tube 210 to connect control electronics 224 to optical fibers 212. Connections between optical fibers 516/518 and fibers 212 may be made with, for example, a fiber tap, splice, port, or another optical connection.

Figure 6B:
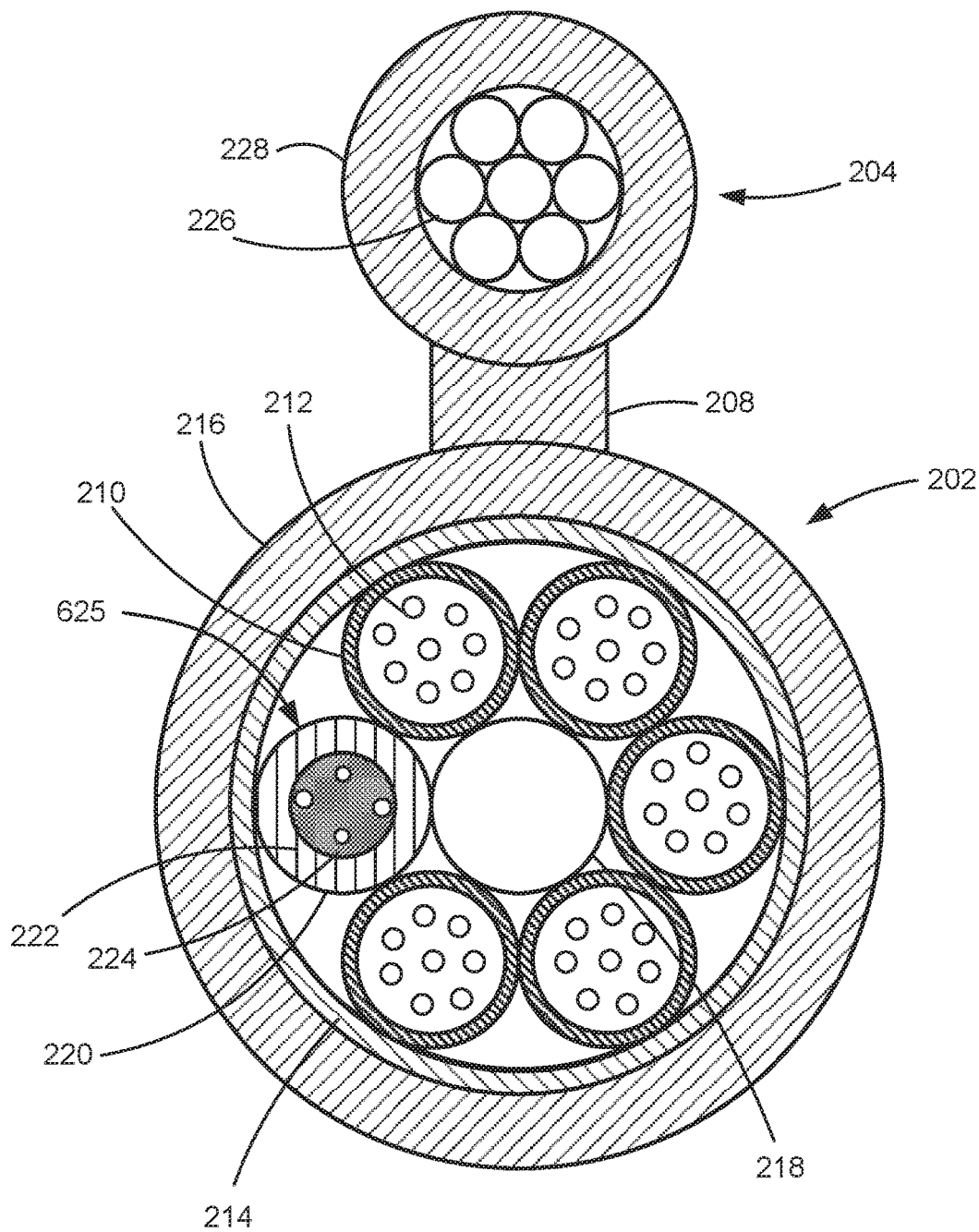

FIGS. 6A and 6B are perspective and cross-sectional diagrams, respectively, of a portion of hybrid cable 620 according to another exemplary implementation. Hybrid cable 620 may include multi-fiber cable section 202 and support section 204 connected by connecting section 208. Multi-fiber cable section 202 may include dielectric strength member 214 surrounded by an outer jacket or sheath 216. Multi-fiber cable section 202 may hold one or more fiber buffer tubes 210 with optical fibers 212 arranged therein and antenna tube 220 including antenna elements 625. Strength member 218 may also be included with fiber buffer tubes 210.

Figure 7B:
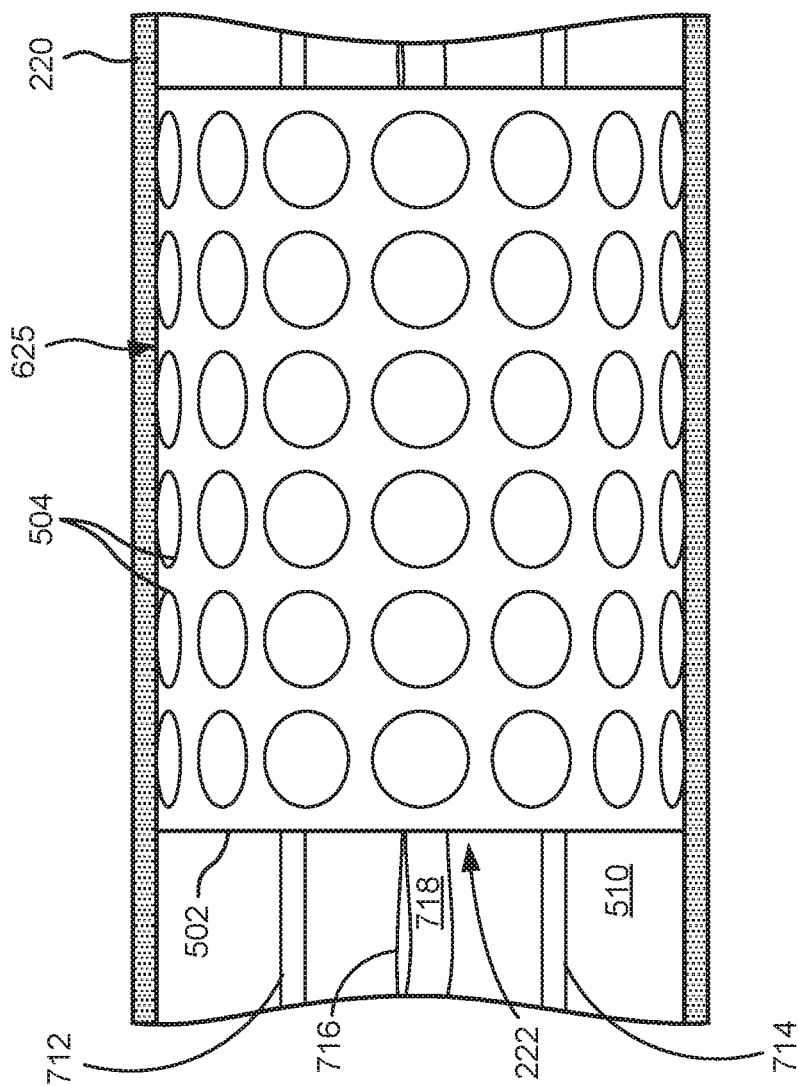
FIG. 7B is a simplified partial cross-sectional view of the network element buffer tube of FIGS. 6A and 6B.
Figure 7A:
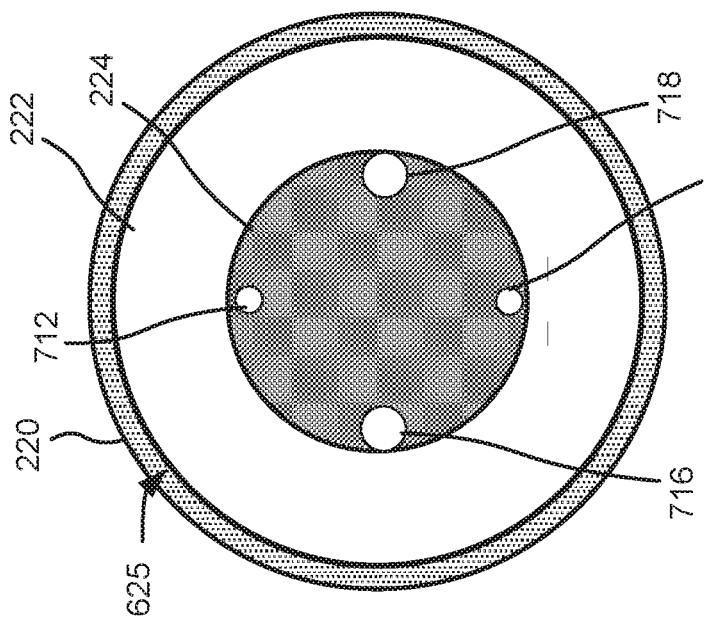
FIG. 7A is a simplified front view of an antenna element of FIGS. 6A and 6B.

FIG. 7A is a simplified front view of an antenna element 625 within antenna tube 220. FIG. 7B is a simplified partial cross-sectional view of a portion of antenna tube 220. According to an implementation, antenna tube 220 may house antenna elements 625 spaced along a length of hybrid cable 620 with communications and power connections included within antenna tube 220. Tube-shaped antenna array 222 and control electronics 244 of antenna elements 625 may include features described above in connection with FIGS. 2-4. In contrast with the configuration of FIGS. 2A and 2B, for example, in the configuration of FIGS. 7A and 7B, there are no connections between control electronics 224 and any of the optical fibers 212 in fiber buffer tubes 210. Also, there are no connections between control electronics 224 and metal strength member 226.

Referring to FIGS. 7A and 7B, multiple antenna elements 625 may be included within a single antenna tube 220. For each of antenna elements 625, tube-shaped antenna array 222 is wrapped around control electronics 224 within a portion of antenna tube 220. Open space 510 or a filler material may separate antenna elements 125 within antenna tube 220.

Power for the antenna elements 625 in antenna tube 220 may be provided via a power line 712 that connects control electronics 224 a power source, such as a power source associated with base station 130. In one implementation, power line 712 may be connected serially or in parallel to multiple antenna elements 625 within antenna tube 220. Similarly, grounding wire 714 may connect control electronics 224 to a grounding element.

Communication signals between antenna elements 625 and base station 130 may be provided via a pair of optical fibers 716/718 that connect control electronics 224 to base station 130. In one implementation, connections to control electronics 224 in each antenna element 625 may tap or splice into optical fibers 716/718.

In other implementations, aspects of hybrid cable 120 and hybrid cable 620 may be combined. For example, in one embodiment, power line 512 and grounding wire 514 (FIGS. 5A and 5B) may connect control electronics 224 to metal strength members 226/232, while optical fibers 716/718 (FIGS. 7A and 7B) may be installed along the length of buffer tube 220 and to connect control electronics 224 to base station 130.

Figure 8B:
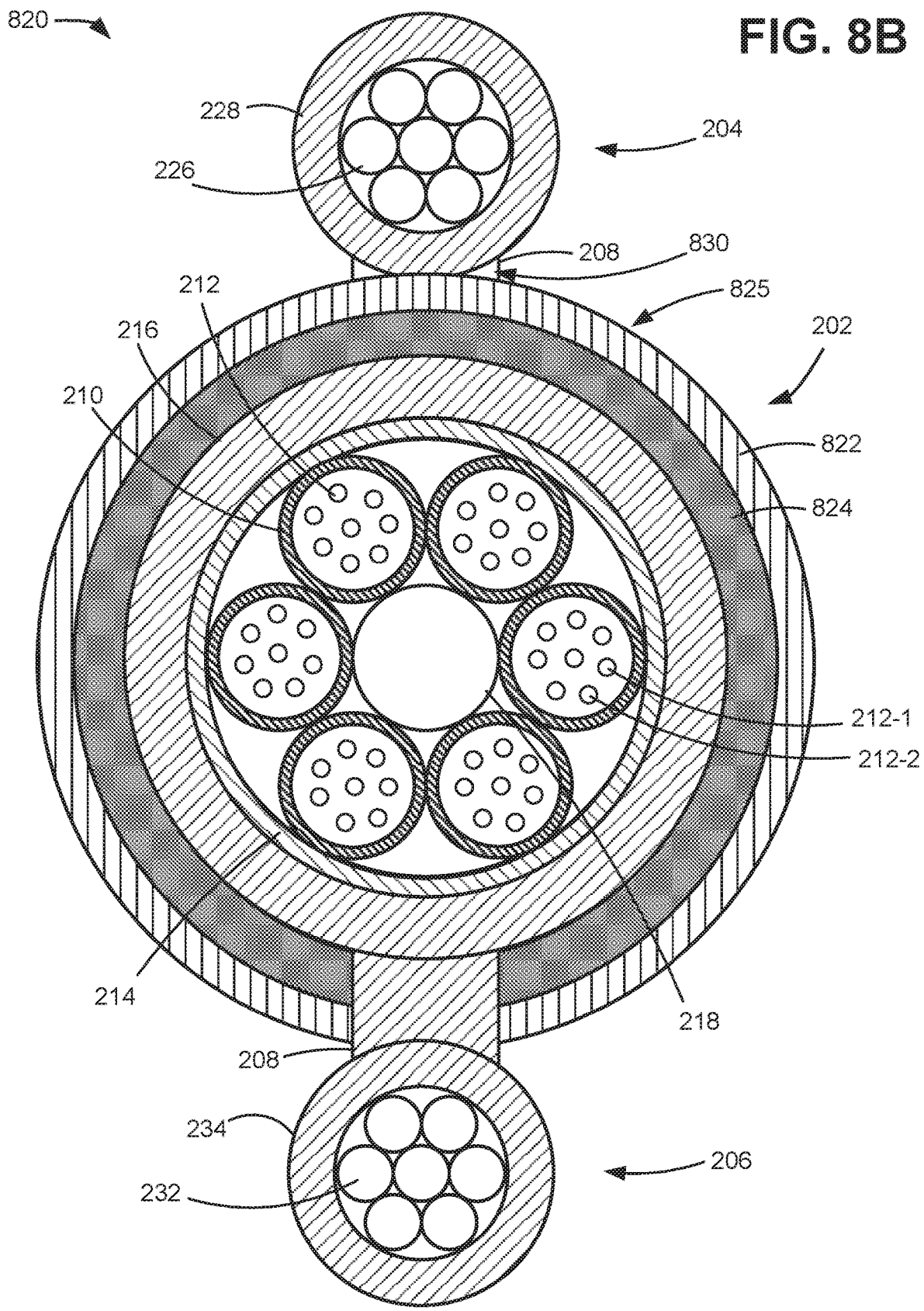

FIGS. 8A and 8B are perspective and cross-sectional diagrams, respectively, of a portion of hybrid cable 820 according to another exemplary implementation Similar to hybrid cable 120 of FIGS. 2A and 2B, hybrid cable 820 may include multi-fiber cable section 202, support section 204, and support section 206 connected by connecting section 208. Multi-fiber cable section 202 may include dielectric strength member 214 surrounded by an outer jacket or sheath 216. Multi-fiber cable section 202 may hold one or more strength member 218 and fiber buffer tubes 210 with optical fibers 212 arranged therein.

In contrast with hybrid cable 120 of FIGS. 2A and 2B, for example, hybrid cable 820 does not include an antenna tube 220 for a distributed antenna array. Instead, antenna elements 825 may be intermittently spaced along a length of hybrid cable 820 outside of sheath 216. Each antenna element 825 may include a substantially-tube-shaped antenna 822 and control electronics 824. In one implementation, both of substantially-tube-shaped antenna 822 and control electronics 824 may extend from one connecting section (e.g., connecting section 208-1) and wrap around sheath 216 through a gap 830 in the other connecting section (e.g., connecting section 208-2) and end at an opposite side of the first connecting section. Antenna element 825 may be bonded or mechanically attached to sheath 216. In another implementation, antenna element 825 may be inserted through gaps 830 in both connecting sections 208-1 and 208-2. Insertion of portions of antenna element 825 through gap 830 may provide physical constraints along the gap boundaries to help hold antenna element 825 in place on sheath 216. In one implementation, sheath 216 may have an outside diameter of about 10-20 mm (e.g., depending on sizing of dielectric strength member 214 to accommodate a desired number of fiber tubes 210 included in section 202). The corresponding circumference of antenna element 825 may be about 10-100 mm, preferably about 30-70 mm.

Metal strength member 226 may be connected to a power source associated with base station 130, for example, to conduct electricity to antenna elements 825 along hybrid cable 820. Metal strength member 232 may be connected to a grounding element associated with base station 130 or any other location. In one implementation, control electronics 824 of antenna elements 825 obtains power from metal strength member 226 and is grounded via metal strength member 232. Connections from control electronics 824 to metal strength members 226 may include wires, pins, or other conductive members extending through sheath 228 (and possibly connecting section 208-1).

One or more pairs of fibers 212 in fiber tubes 210 of hybrid cable 820, such as fibers 212-1 and 212-2, may be connected directly or indirectly to base station 130. Control electronics 824 may communicate with base station 130 by the pair of fibers. For example, control electronics 824 may receive signals from substantially-tube-shaped antenna 822, may perform signal processing, and may forward the processed signals to base station 130 via fibers 212-1 or 212-2. Also, base station 130 may provide both communications and control signals to control electronics 824 via fibers 212-1 or 212-2. Optical connections between fibers 212 and control electronics 824 may use, for example, fibers that pass through fiber buffer tubes 210, dielectric strength member 214, and sheath 216. Optical connections to fibers 212 may be made with, for example, a fiber tap, splice, port, or another optical connection.

Figure 9:
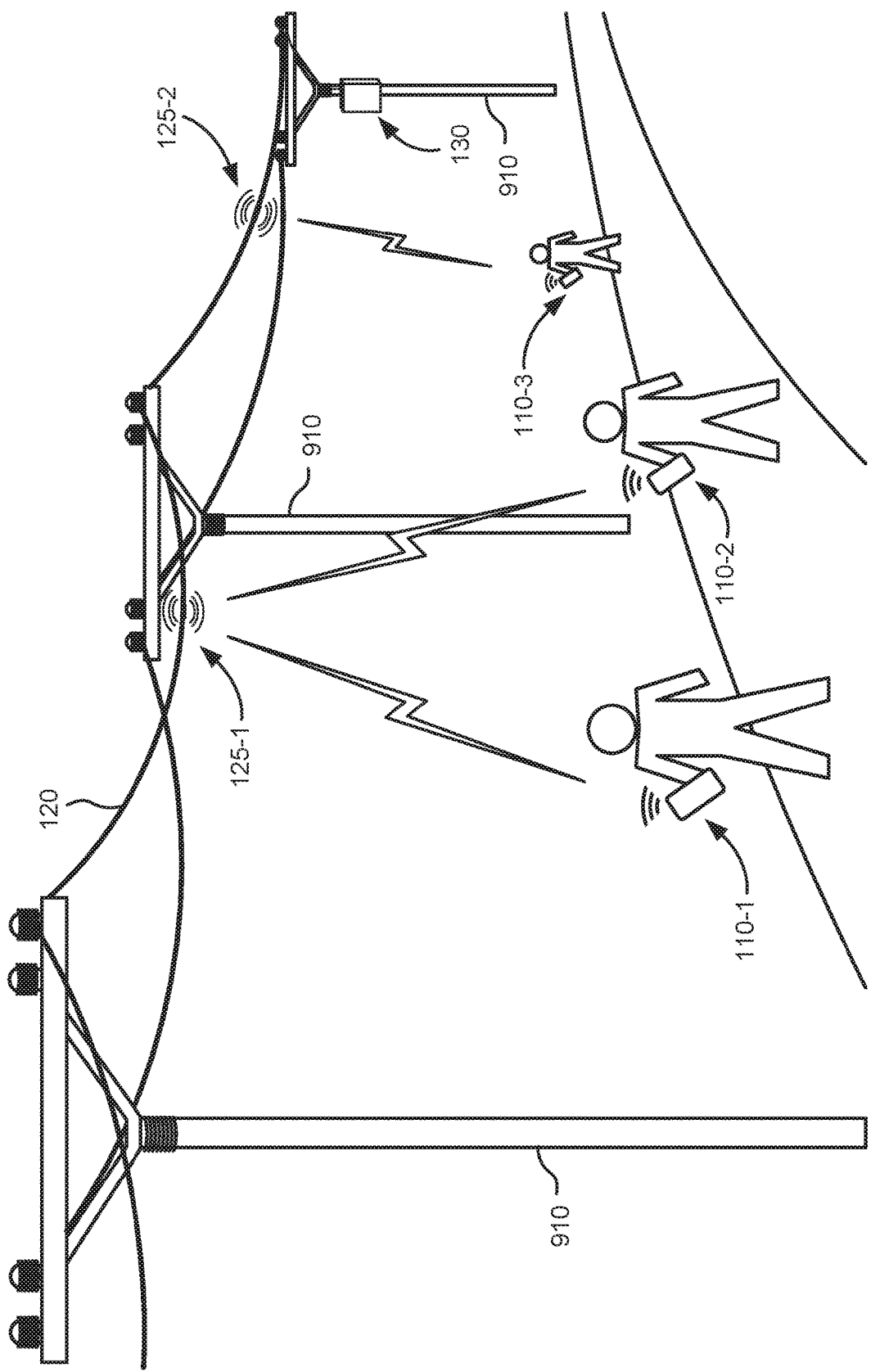
FIG. 9 is a diagram illustrating a use case for a hybrid fiber optic cable, according to an implementation.

FIG. 9 is a diagram of a use case for a hybrid fiber optic cable according to an implementation. As shown in FIG. 9, hybrid cables 120 may be installed in an overhead arrangement such that antenna element 125-1 and 125-2 are positioned, for example, mid-span between different mounting poles 910. A base station 130 may be mounted on one of mounting poles 910. Each of antenna elements 125-1 and 125-2 may have an optical fiber connection and a power connection with base station 130. Antenna element 125-1 may receive signals from and transmit signals to mobile devices 110-1 and 110-2 over an air interface using mmWave frequencies. Simultaneously, antenna element 125-2 may receive signals from and transmit signals to mobile device 110-3 over an air interface using mmWave frequencies. Uplink signals received from antenna elements 125-1 and 125-2 may be sent to base station 130 for processing and forwarding to other network devices in wireless access network 140 (not shown) Similarly, downlink signals from wireless access network 140 may be sent through base station 130 and antenna elements 125-1 or 125-2 to mobile devices 110-1/110-2 and 110-3, respectively.

Systems described herein provide a high-frequency antenna element, which contains a high-frequency antenna array and electronics, built into a fiber optic aerial cable to form a hybrid fiber optic cable. The hybrid fiber optic cable may have a fiber buffer tube including one or more fiber cores, an outer sheath surrounding the fiber buffer tube, and a distributed array of antenna elements integrated along a length of the hybrid fiber optic cable. Each of the antenna elements may include a high-frequency wave antenna and control electronics for the high-frequency wave antenna. A base station may control multiple high-frequency antenna elements distributed throughout one or more hybrid fiber optic cables.

The foregoing description of implementations provides illustration and description, but is not intended to be exhaustive or to limit the invention to the precise form disclosed. Modifications and variations are possible in light of the above teachings or may be acquired from practice of the invention. For example, while particular arrangements for optical and power connections to antenna elements have been described, in other implementations, different types of optical connections and/or power connections may be used for the antenna elements. Also, particular locations of the antenna elements on the hybrid fiber optic cable may vary. For example, the tube-shaped antenna array 222 may be located on the outside surface of antenna tube 220, or tube-shaped antenna array 822 may be located on an inside surface of dielectric strength member 214 or a water barrier within sheath 216.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A hybrid cable, comprising:
a fiber buffer tube including one or more fiber cores;
an outer sheath surrounding the fiber buffer tube; and
a distributed array of antenna elements integrated along a length of the hybrid cable, wherein each of the antenna elements includes:
a planar antenna, including multiple antenna apertures, formed around a portion of the outer sheath, and
control electronics for the planar antenna.

2. The hybrid cable of claim 1, further comprising:
a power line to provide power to the distributed array of antenna elements.

3. The hybrid cable of claim 2, further comprising:
a grounding line for the distributed array of antenna elements.

4. The hybrid cable of claim 1, wherein the planar antenna is formed into a tube-shape.

5. The hybrid cable of claim 1, wherein the control electronics are positioned between the planar antenna and the outer sheath.

6. The hybrid cable of claim 1, further comprising:
a support section outside of the outer sheath, the support section including an external strength member.

7. The hybrid cable of claim 6, further comprising:
a gallus located between the support section and the outer sheath, the gallus including a gap through which the planar antenna is inserted.

8. The hybrid cable of claim 7, wherein the external strength member supplies electrical power to the distributed array of antenna elements.

9. The hybrid cable of claim 8, further comprising:
another external strength member located outside of the outer sheath, the other external strength member providing a grounding path for the distributed array of antenna elements.

10. The hybrid cable of claim 1, wherein each of the planar antennas are configured to receive millimeter-wave (mmWave) frequencies.

11. A system, comprising:
a hybrid cable, including:
a fiber buffer tube with one or more fiber cores;
an outer sheath surrounding the fiber buffer tube; and
a distributed array of antenna elements integrated along a length of the hybrid cable, wherein each of the antenna elements includes:
a planar antenna, including multiple antenna apertures, formed around a portion of the outer sheath, and
control electronics for the planar antenna.

12. The system of claim 11, wherein the planar antenna includes a planar high-frequency wave antenna formed into a tube-shape.

13. The system of claim 11, wherein the control electronics are positioned between the planar antenna and the outer sheath.

14. The system of claim 11, further comprising:
a first external strength member located outside of the outer sheath, wherein the first external strength member is configured to supply electrical power to the distributed array of antenna elements; and
a second external strength member located outside of the outer sheath, wherein the second external strength member is configured to provide a grounding path for the distributed array of antenna elements.

15. The system of claim 11, further comprising:
a base station device connected to the distributed array of antenna elements, the base station device including:
one or more memories to store instructions; and
one or more processors to execute the instructions to:
receive downlink signals from a wireless access network and transmit the signals to a mobile device using one of the antenna elements, and
receive uplink signals from the mobile device using one of the antenna elements and transmit the signals to the wireless access network.

16. The system of claim 15, wherein the base station further comprises a power source for providing power to the control electronics.

17. The system of claim 16, wherein the hybrid cable further includes:
an external strength member located outside of the outer sheath, wherein the external strength member is configured to provide power from the power source to the control electronics.

18. The system of claim 11, wherein the hybrid cable further includes:
an external strength member located outside of the outer sheath.

19. A hybrid cable, comprising:
a buffer tube including one or more fiber cores;
an outer sheath surrounding the buffer tube; and
a distributed array of antenna elements integrated along a length of the hybrid cable, wherein each of the antenna elements includes:
a planar antenna, including multiple antenna apertures, and
control electronics for the planar antenna located around a portion of the outer sheath, wherein the antenna is formed adjacent to the control electronics.

20. The hybrid cable of claim 19, further comprising an external strength member located outside of the outer sheath.

* * * * *